US007978715B2

(12) United States Patent
Sasaki

(10) Patent No.: US 7,978,715 B2
(45) Date of Patent: Jul. 12, 2011

(54) NETWORK CONNECTION DEVICE AND COLLECTION/DISTRIBUTION DEVICE

(75) Inventor: Takanori Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/318,573

(22) Filed: Dec. 31, 2008

(65) Prior Publication Data
US 2009/0290510 A1 Nov. 26, 2009

(30) Foreign Application Priority Data
May 22, 2008 (JP) .................... 2008-134640

(51) Int. Cl.
*H04L 12/28* (2006.01)
*H04L 12/56* (2006.01)
*H04J 1/16* (2006.01)
(52) U.S. Cl. ............ 370/401; 370/395.51; 370/218
(58) Field of Classification Search .............. 370/390
See application file for complete search history.

(56) References Cited

U.S. PATENT DOCUMENTS

| 6,981,174 | B1 * | 12/2005 | Hanning | 714/5 |
| 6,990,121 | B1 * | 1/2006 | Stiles et al. | 370/498 |
| 7,227,844 | B1 * | 6/2007 | Hall et al. | 370/242 |
| 7,369,551 | B2 * | 5/2008 | He et al. | 370/389 |
| 2003/0117952 | A1 * | 6/2003 | Ueno et al. | 370/228 |
| 2003/0137937 | A1 * | 7/2003 | Tsukishima et al. | 370/230 |
| 2006/0088043 | A1 * | 4/2006 | Goody | 370/401 |
| 2007/0071014 | A1 * | 3/2007 | Perera et al. | 370/396 |
| 2008/0037581 | A1 * | 2/2008 | Asano | 370/466 |

FOREIGN PATENT DOCUMENTS
JP 2005-130408 5/2005
* cited by examiner

*Primary Examiner* — Daniel J Ryman
*Assistant Examiner* — Cassandra Decker
(74) *Attorney, Agent, or Firm* — Fujitsu Patent Center

(57) ABSTRACT

A network connection device for connecting an asynchronous network having a link aggregation function to a synchronous network comprises: a first mapping/demapping unit which maps asynchronous network frames, flowing from the asynchronous network to the synchronous network on a plurality of links redundantly configured using the link aggregation function, into synchronous network frames, and which demaps asynchronous network frames mapped into synchronous network frames flowing from the synchronous network to the asynchronous network on the plurality of links into synchronous network frames; and a collection/distribution unit which collects the asynchronous network frames, mapped into the synchronous network frames on the plurality of links, into an asynchronous network frame mapped into a synchronous network frame on a single link, and which, in accordance with a prescribed rule, distributes an asynchronous network frame, mapped into a synchronous network frame on the single link and flowing from the synchronous network to the asynchronous network, among the asynchronous network frames mapped into the synchronous network frames on the plurality of links, and supplies the thus mapped asynchronous network frames to the first mapping/demapping unit.

4 Claims, 6 Drawing Sheets

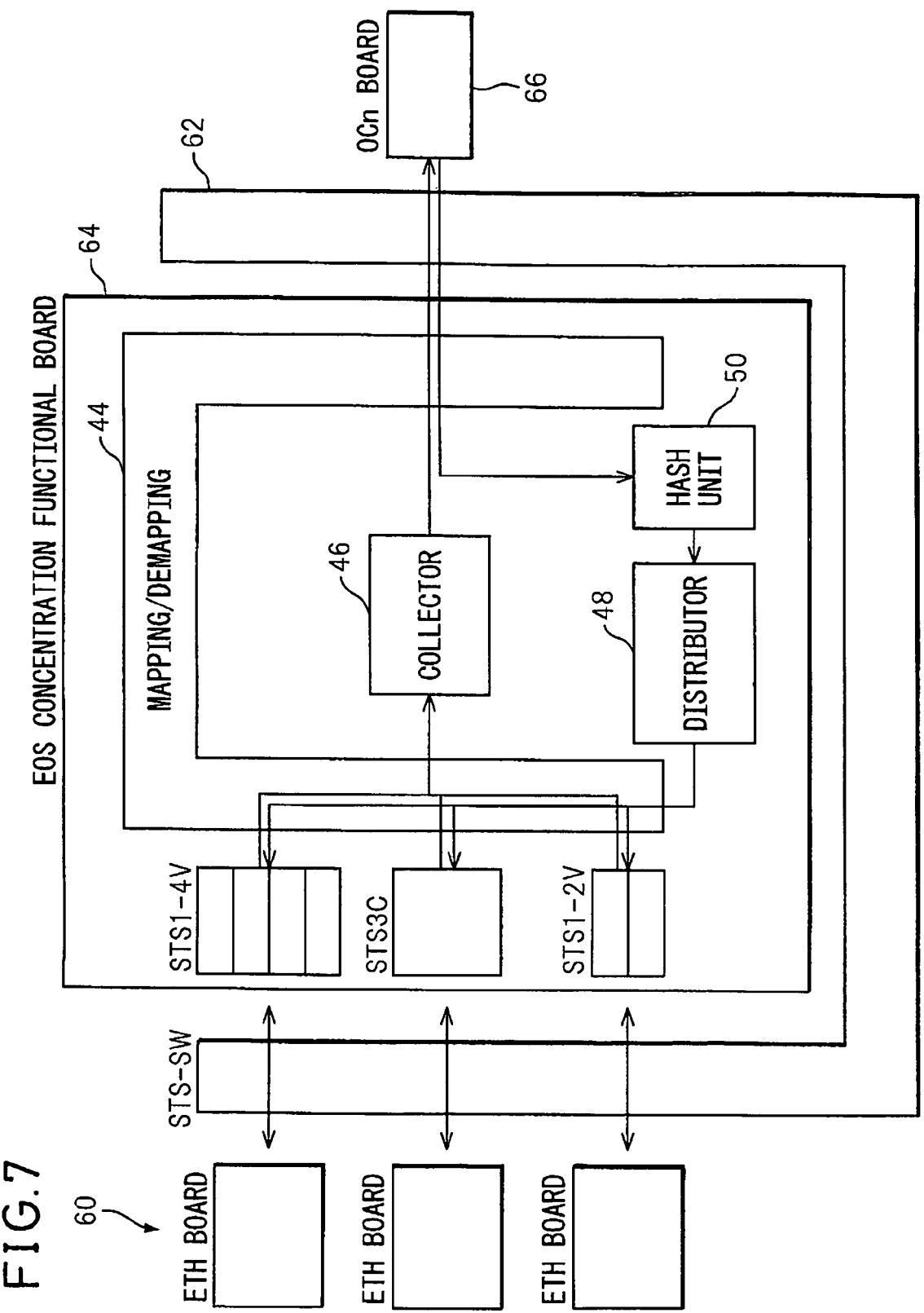

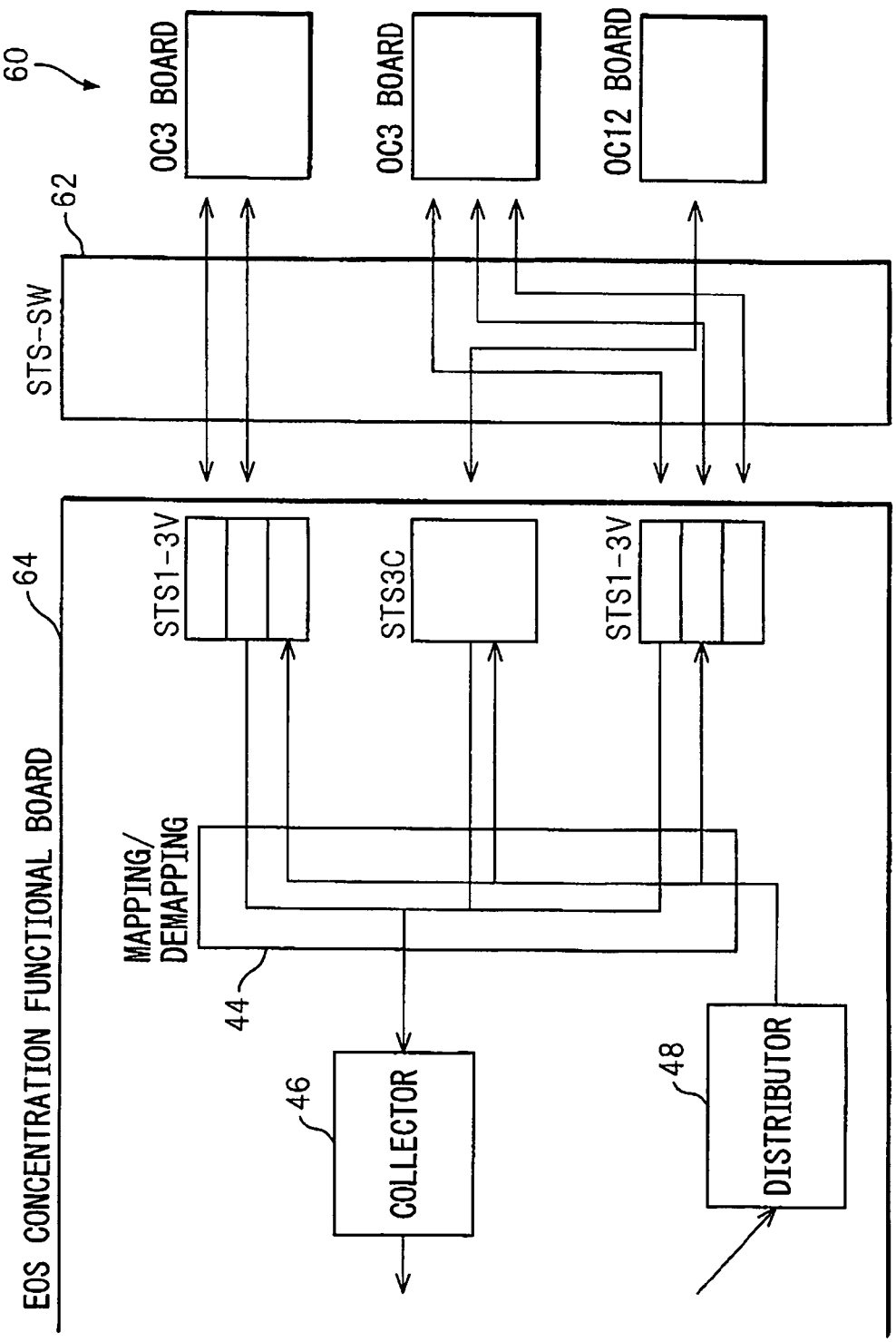

NETWORK CONNECTION DEVICE AND COLLECTION/DISTRIBUTION DEVICE

This application is based upon and claims the benefit of priority of the prior Japanese Patent Application No. 2008-134640, filed on May 22, 2008, the entire contents of which are incorporated herein by reference.

FIELD

The present invention relates to a network connection device that can connect an asynchronous network to a synchronous network by using a redundant configuration, and also relates to a collection/distribution device suitable for use in the same.

BACKGROUND

In recent years, "wide area Ethernet® service" that provides a network service using versatile Ethernet® equipment has come to be used as the backbone of an intra-enterprise network by an increasing number of users since it is inexpensive and there are no restrictions on the protocols that can be used.

However, because of its low cost and versatility, Ethernet® equipment is prone to failure, and is therefore not suited to accommodate lines that carry data such as bank account data for which high reliability is demanded. Accordingly, there is a need for a network configuration that achieves a balance between the low cost and the high reliability by using Ethernet® equipment for accommodating user lines and SONET equipment for transmission between user sites.

In this case, a protection scheme such as described below is employed when connecting between Ethernet® equipment and SONET equipment by using a redundant configuration.

In a synchronous network such as a SONET, redundancy is implemented by setting a plurality of paths along a redundantly configured segment, with provisions made to select one of the paths for use.

On the other hand, in a network such as an Ethernet® that determines a path through flooding and address learning, if a plurality of links are provided between two switches as in a synchronous network, frame duplication and looping occur, and consequently, the redundant configuration cannot be implemented by such a method, as described in detail in Japanese Laid-open Patent Publication No. 2005-130408. Accordingly, in the case of Ethernet®, it is usual to implement redundancy by using a link aggregation function that bundles together a plurality of links in a virtual fashion.

The link aggregation function includes a function for distributing frames arriving at a switch to a plurality of links in accordance with a prescribed rule, and a function for collecting frames arriving from a plurality of links onto a single link. If one of the plurality of links fails, failure recovery is performed by changing the distribution rule so that no frame flows to that link (degenerate operation).

FIG. 1 shows a first example of redundantly configuring the connection between the Ethernet® and the SONET; in this example, the connection between the Ethernet® and the SONET is redundantly configured by directly linking the link aggregation of the Ethernet® to the redundant configuration of the SONET. A frame arriving at a port C of the Ethernet® equipment 10 having the link aggregation function is distributed to a port A or a port B according to a prescribed rule, i.e., according to whether the total number of 1 bits contained in the source MAC address and the destination MAC address is odd or even. On the other hand, frames arriving at ports A and B are combined together and sent out from port C.

The port A and the port B are connected to a working port and a protection port, respectively, on the SONET equipment 12. At the SONET equipment 12 side, the signal received via the working port is selected by a switch 13 and sent to the WAN side. Though not shown here, a facility for mapping an Ethernet® frame into a SONET frame to form an EOS (Ethernet Over SONET) frame and for demapping the EOS frame into the Ethernet® frame is provided between the Ethernet® equipment 10 and the SONET equipment 12.

At the SONET equipment 12 side, since the switch 13 is set to select the working port, if a signal is received from the protection port, the signal cannot be sent to the WAN side. Therefore, as shown by reference numeral 14, either the link is forcefully cut off or the light transmission is stopped at the protection port so that all the transmitted signal is received at the working port by the earlier described degenerate operation. If the protection link is not cut off here, part of the signal is transmitted on the protection link because of the link aggregation and, since that part of the signal is not delivered to the WAN side, a signal dropout occurs.

FIG. 2 is a diagram showing a method for recovery when a failure occurs at the working port in the connection shown in FIG. 1.

Upon detecting the occurrence of failure at the working port, the SONET equipment 12 clears the link shutoff state of the protection port and, at the same time, throws the switch 13 to the protection side so that the signal from the protection port can be received. At the Ethernet® equipment 10, the link aggregation function operates upon detection of a failure at the port A, and all the signal is transmitted from the port B. This series of operations provides the protection function.

Since this method uses the link aggregation function generally provided in Ethernet® devices, the advantage is that any suitable device can be used to accommodate users, but since the SONET equipment is unable to receive both the working and protection links simultaneously, and the link on the protection side has to be normally held in the shutoff state, there arises the problem that it is not possible to monitor the protection side to verify its properly functioning state.

FIG. 3 shows a second example, in which the link aggregation function of Ethernet® is also incorporated in the SONET equipment and the connection between the Ethernet® and the SONET is redundantly configured by connecting between them using redundant links implemented by the link aggregation. In FIG. 3, equipment corresponding to the Ethernet® equipment 10 in FIGS. 1 and 2 is not shown.

In FIG. 3, Ether frames received at two Ethernet® ports 16 and 18 are collected by a collector 20 into one frame which is then mapped by a mapping unit 22 onto a SONET frame for output to the WAN side. A SONET frame received from the WAN side is disassembled into Ether frames by a demapping unit 24, and the path is calculated by a path calculator 26; then, each Ether frame is distributed by a distributor 28 to the port 16 or 18.

In this example, the link aggregation function of the Ethernet® is also incorporated in the SONET equipment 12, and the SONET equipment is connected to the Ethernet® equipment by the plurality of links redundantly configured by the link aggregation. Accordingly, the above-described problem of being unable to monitor the protection side to verify its properly functioning state does not occur here, because signals are flowing on all the links as long as the links are functioning properly.

However, there arises the problem that the collector 20, the path calculator 26, and the distributor 28, which together implement the link aggregation function, cannot be configured redundantly though they are Ethernet® devices having low reliability.

SUMMARY

Accordingly, an object of the disclosure is to provide a network connection device that overcomes the above problem and a collection/distribution device for use in the same.

A network connection device for connecting an asynchronous network having a link aggregation function to a synchronous network, according to an embodiment, comprises: a first mapping/demapping unit which maps asynchronous network frames, flowing from the asynchronous network to the synchronous network on a plurality of links redundantly configured using the link aggregation function, into synchronous network frames, and which demaps asynchronous network frames mapped into synchronous network frames flowing from the synchronous network to the asynchronous network on the plurality of links, into asynchronous network frames; and a collection/distribution unit which collects the asynchronous network frames from the first mapping/demapping unit, mapped into the synchronous network frames on the plurality of links, into an asynchronous network frame mapped into a synchronous network frame on a single link, and which, in accordance with a prescribed rule, distributes an asynchronous network frame, mapped into a synchronous network frame on the single link and flowing from the synchronous network to the asynchronous network, among the asynchronous network frames mapped into the synchronous network frames on the plurality of links and supplies the thus mapped asynchronous network frames to the first mapping/demapping unit.

A collection/distribution device according to another embodiment comprises: a collector which collects asynchronous network frames arriving from a plurality of links onto a single link; a distributor which distributes an asynchronous network frame, received from the single link, among the plurality of links in accordance with a prescribed rule; and a mapping/demapping unit which demaps the asynchronous network frames mapped into synchronous network frames, into asynchronous network frames and supplies the thus demapped asynchronous network frames to the collector and the distributor, and which maps the asynchronous network frames from the collector and the distributor into the synchronous network frames.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The present invention will be more clearly understood from the description as set below with reference to the accompanying drawings, wherein:

FIG. 7 is a diagram showing one example of an actual device configuration according to an embodiment; and FIG. 8 is a diagram showing a redundant configuration implemented at the NNI side by an EOS concentration functional board according to an embodiment.

DESCRIPTION OF EMBODIMENT(S)

Figure 1:
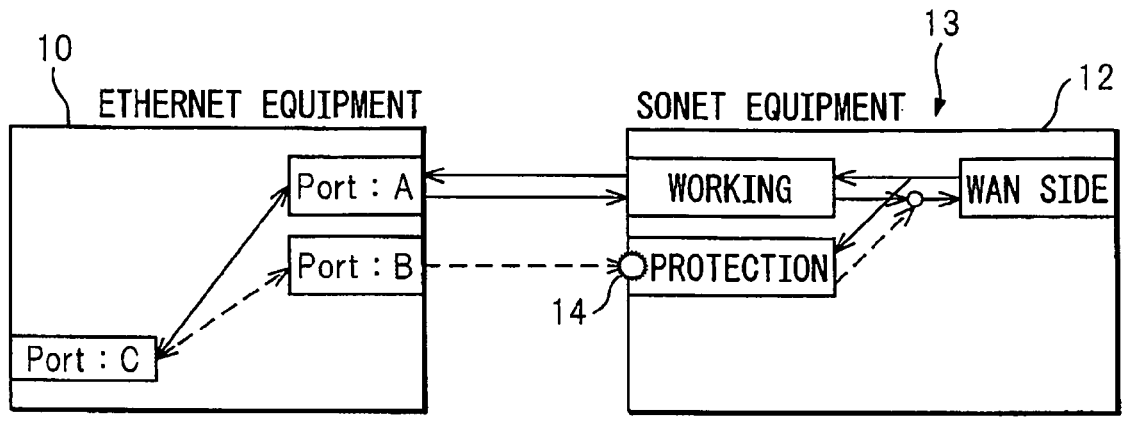
FIG. 1 is a diagram showing a first prior art example.
Figure 2:
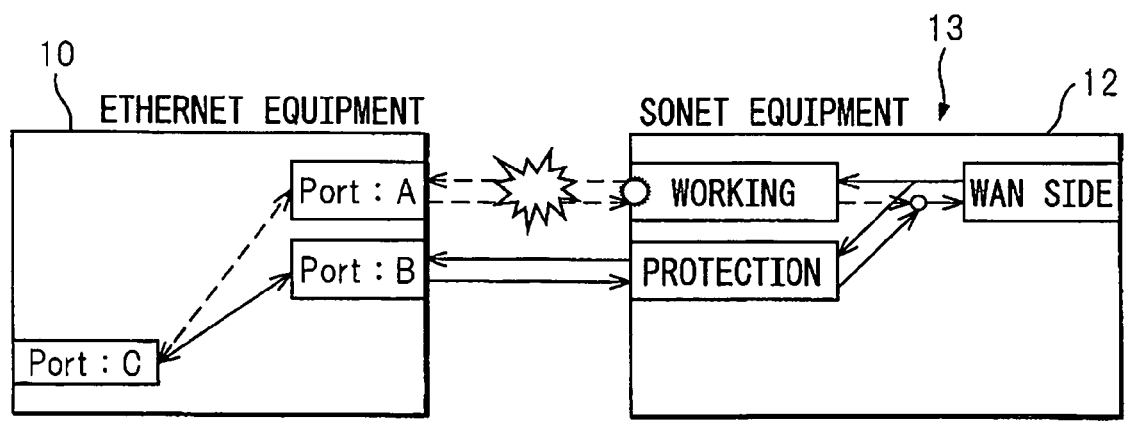
FIG. 2 is a diagram for explaining failure recovery in the first prior art example.
Figure 3:
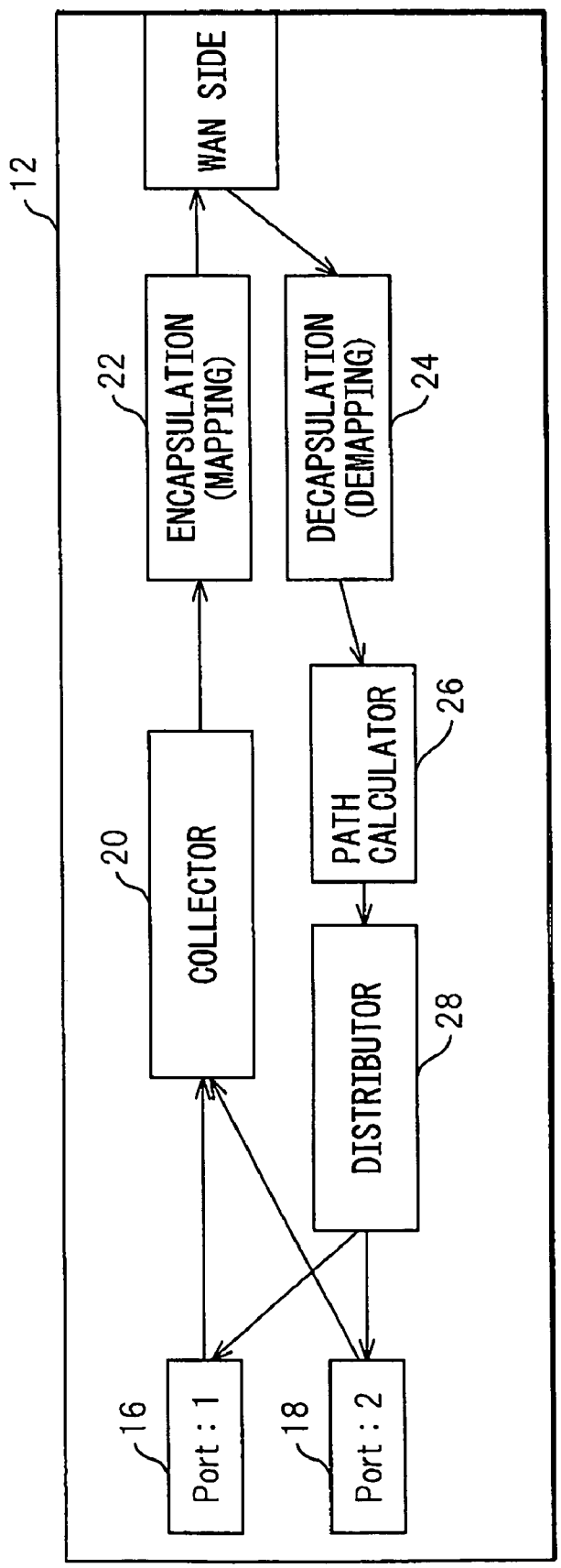
FIG. 3 is a diagram showing a second prior art example.
Figure 4:
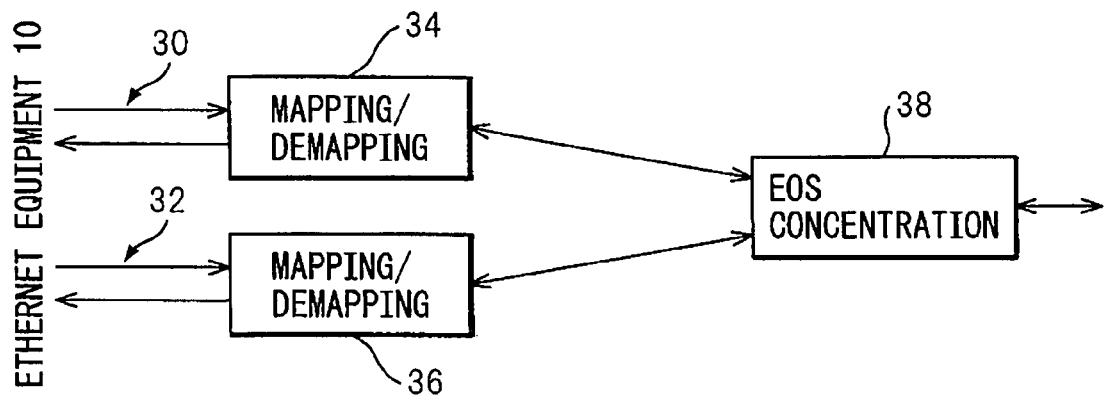
FIG. 4 is a block diagram showing the configuration of a device according to an embodiment.

FIG. 4 shows the configuration of a device according to an embodiment for connecting an Ethernet® as an example of an asynchronous network to a SONET as an example of a synchronous network. As in FIG. 3, equipment corresponding to the Ethernet® equipment 10 in FIGS. 1 and 2 is not shown here.

As in the prior art shown in FIG. 3, the device shown in FIG. 4 is connected to the Ethernet® equipment by a plurality of links 30 and 32 redundantly configured by the link aggregation function of Ethernet®. For the respective redundantly configured links, mapping/demapping units 34 and 36 map Ethernet® frames received from the Ethernet® equipment 10 into SONET STS-n frames, and demap Ethernet® frames mapped into STS-n frames received from an EOS (Ether over SONET) concentration unit 38 into Ethernet® frames. A detailed configuration example will be described later, but briefly, the EOS concentration unit 38 collects the Ethernet® frames, mapped into the STS-n frames on the plurality of links, into an EOS frame on a single link, and distributes an EOS frame, flowing on the single link in the opposite direction, among the plurality of links in accordance with a prescribed rule. In other words, the plurality of STS-n channels between the mapping/demapping units 34, 36 and the EOS concentration unit 38 are grouped together to constitute the link aggregation of Ethernet®.

Figure 5:
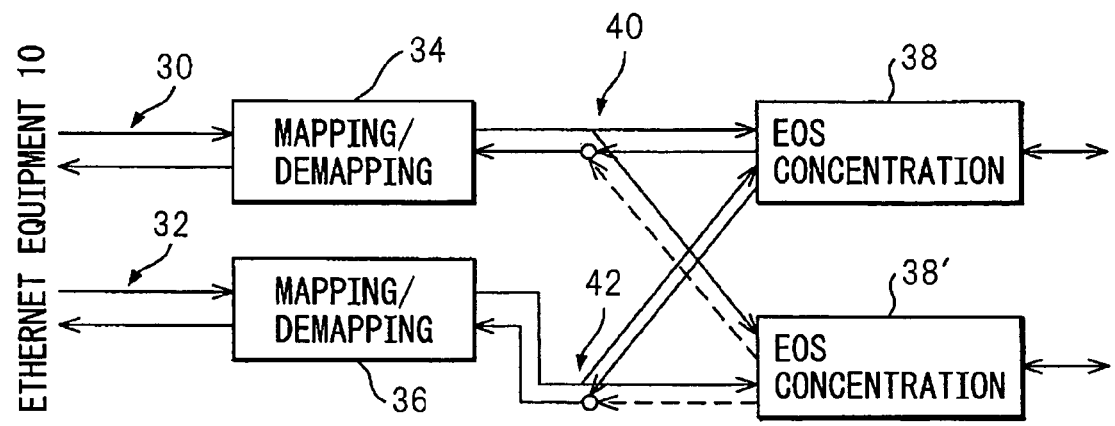
FIG. 5 is a block diagram showing a redundant configuration of an EOS concentration unit 38 in the device of FIG. 4.

In the connection configuration of FIG. 4, Ethernet® frames from the Ethernet® equipment 10 are mapped by the mapping/demapping units 34 and 36 into STS-n frames and input as STS-n signals into the EOS concentration unit 38, and signals from the EOS concentration unit 38 are also input as STS-n signals into the mapping/demapping units 34 and 36. Accordingly, as depicted in FIG. 5, the EOS concentration unit 38 can be easily configured redundantly by using switches 40 and 42 which perform working/protection switching. On the other hand, the links to the Ethernet® equipment 10 are redundantly configured using the link aggregation function of Ethernet®. Accordingly, the problem of being unable to monitor the protection side to verify its properly functioning state does not occur here, because signals are flowing on all the links as long as the links are functioning properly.

Figure 6:
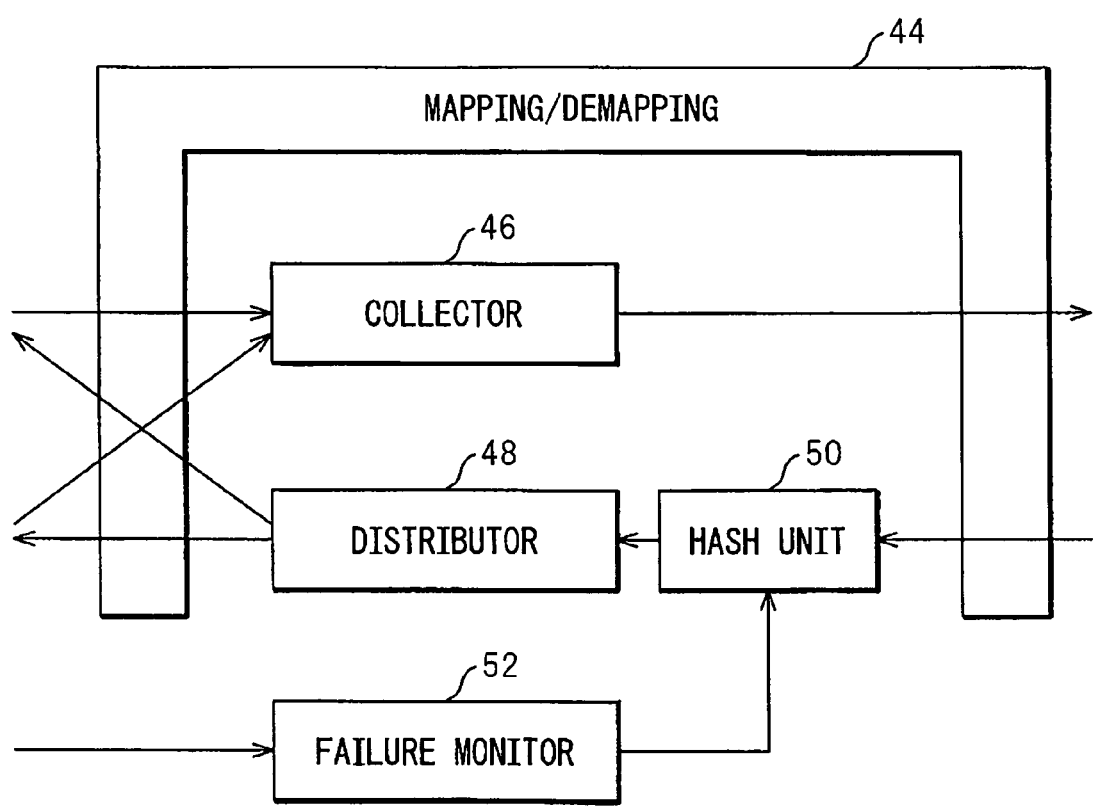
FIG. 6 is a block diagram showing a detailed configuration example of the EOS concentration unit 38.

FIG. 6 shows a detailed configuration example of the EOS concentration unit 38. Each EOS frame can be directly collected/distributed by referring to the Ethernet® frame encapsulated in the EOS frame, unless the Ethernet® frame is mapped across different STS-n frames. On the other hand, in the example of FIG. 6, each EOS frame input into the EOS concentration unit 38 is first demapped by a mapping/demapping unit 44 into the Ethernet® frame for collection/distribution, and then the Ethernet® frame is mapped by the mapping/demapping unit 44 again into the EOS frame for output. A collector 46 collects the Ethernet® frames arriving from the plurality of links onto a single link, while a distributor 48 distributes the Ethernet® frame on the single link among the plurality of links. A hash unit 50 calculates a hash value, for example, from the source MAC address and destination MAC address of the frame, and determines, based on the hash value, the destination for the distribution of the frame in the distributor 48. A failure monitoring unit 52 monitors for failures that may occur on the links redundantly configured by the link aggregation and, if a link failure is detected, notifies the hash unit 50 accordingly. The hash unit 50 thus notified changes the rule so that the frame is distributed by excluding the failed link.

FIG. 7 shows one example of the actual device configuration of SONET equipment that can be connected to Ethernet® equipment by using a redundant configuration.

In FIG. 7, an ETH board 60 is where an Ethernet® cable is connected, and includes the function of the earlier described mapping/demapping units 34, 36 (FIGS. 4 and 5). An OCn board 66 is where a SONET STS-n channel is converted to an OCn channel, and an optical cable is connected to it. An EOS concentration functional board 64 includes the function of the EOS concentration unit 38 shown in FIG. 6. An STS-SW 62 provides the function of a cross-connect between the ETH board 60 and the EOS concentration functional board 64 and between the EOS concentration functional board 64 and the OCn board 66, as well as a working/protection switching function (path switching function) for implementing the redundant configuration of the EOS concentration functional board 64.

In the example shown in FIG. 7, the link aggregation of Ethernet® is implemented with SONET STS1-4V, STS3C, and STS1-2V channels forming virtual ports, providing a link having a total bandwidth of 450 Mbps=50 Mbps×4+50 Mbps×2+150 Mbps.

As shown in the above example, the link aggregation can be implemented using not only two but also three or more virtual ports. The port type and port bandwidth may be the same or different between the virtual ports forming the link aggregation. In the hash unit 50, the rule is set so that the frame is distributed according to the bandwidth of each virtual port on the assumption that all the virtual ports are functioning properly. If a failure of any one of the virtual ports is detected, the failure is reported to the hash unit 50 which then changes the rule so that the frame is distributed by excluding the failed virtual port.

The link bandwidth can be increased from the condition shown in FIG. 7 by one of two methods, that is, by increasing the bandwidth per virtual port or by adding a new virtual port to the group of virtual ports forming the link aggregation.

In the former case, since the STS-n channels forming the virtual ports are not restricted to any specific type or size, as earlier described, there will be no problem if the size is changed while the system is in service. If the virtual port currently having the capacity of STS1-2V is increased, for example, to STS1-3V by using a function such as the link capacity adjustment scheme (LCAS), the total link capacity increases from 450 Mbps to 500 Mbps. Further, by using the ADD function of LCAS, the bandwidth can be increased without affecting the service.

In the latter case, since there is no upper limit to the number of virtual ports forming the link group, if a new virtual port having the capacity of STS3C, for example, is added to the link aggregation configuration of FIG. 7 currently constructed from three virtual ports, the total link capacity increases from 450 Mbps to 600 Mbps. By changing the hash table (by adding the new virtual port) after adding the virtual port, the bandwidth can be increased without affecting the service.

When decreasing the service bandwidth, either of the above two methods can be used in a manner similar to that used to increase the bandwidth.

In this case also, by removing the target virtual port in advance from the hash table, the bandwidth can be decreased without affecting the service.

There are no restrictions on the type and size of the STSs that can be connected to the EOS concentration functional board 64, as earlier described; in addition to that, since the connection to the EOS concentration functional board 64 need only be made using STS, there is no limitation that the interface that follows be the user accommodating side, that is, the UNI (User-Network Interface); this means that the NNI (Network-Network Interface) side can also be redundantly configured using the link aggregation.

For example, in the EOS concentration functional board, the three virtual ports of FIG. 7 providing the 450-Mbps signal may be replaced by five virtual ports implemented by STS1-2V to form the link aggregation, and the signal may be output at OC3×5 ports, or the link aggregation may be formed by using three virtual ports implemented by STS3C, and the signal may be output at OC3×2 ports and OC12×1 port.

FIG. 8 shows one example of the connections to the OCn boards at the NNI.

The device disclosed herein has the following advantages.

1) The link aggregation can be implemented across the boundary to the Ethernet®, without having to change the configuration of the STS-SW in the existing SONET equipment.

2) The link aggregation can also be implemented at the SONET equipment side across the boundary to the Ethernet®, which serves to ensure high reliability.

3) Since the link aggregation can also be implemented for each STS-CH at the NNI side that follows the EOS concentration functional board, a flexible network configuration can be achieved.

Since the disclosed network connection device implements the connections to the asynchronous network by the links redundantly configured using the link aggregation function of the asynchronous network, the problem of being unable to monitor the protection side to verify its properly functioning state, as in the earlier described first prior art example, does not occur here. Further, since the link aggregation is implemented across the boundary between the two networks, and since the collection/distribution unit provided at one end of the segment redundantly configured by the link aggregation performs frame collection and distribution on the asynchronous network frames mapped into synchronous network frames, not only can high reliability be ensured, but the collection/distribution unit itself can be redundantly configured using the redundancy function of the synchronous network.

The collection/distribution device having the earlier described configuration can be used as the above collection/distribution unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A network connection device for directly connecting an asynchronous network having a link aggregation function to a synchronous network, comprising:

a plurality of first mapping/demapping units which are placed on a plurality of links respectively and map first asynchronous network frames, flowing from the asynchronous network to the synchronous network on the plurality of links redundantly configured using the link aggregation function, into first synchronous network frames, and which demap second synchronous network frames, each comprising a respective second asynchronous network frame and flowing from the synchronous network to the asynchronous network on the plurality of links, into the respective second asynchronous network frames mapped therein; and a collection/distribution unit wherein said collection/distribution unit is configured to perform:

receiving said first synchronous network frames from said plurality of first mapping/demapping units;

demapping said first synchronous network frames into said first asynchronous network frames mapped therein;

collecting said first asynchronous network frames on the plurality of links onto a single link;

mapping said first asynchronous network frames on said single link into a third synchronous network frame flowing to the synchronous network;

receiving a fourth synchronous network frame comprising said second asynchronous network frames and flowing from the synchronous network;

demapping said fourth synchronous network frame into said second asynchronous network frames mapped therein;

distributing said second asynchronous network frames among a plurality of virtual ports;

mapping each of said second asynchronous network frames distributed among the plurality of virtual ports into a respective one of said second synchronous network frames; and supplying said second synchronous network frames to a respective one of the plurality of first mapping/demapping units.

2. A network connection device as claimed in claim 1, further comprising a switch unit which is provided between the plurality of first mapping/demapping units and the collection/distribution unit to redundantly configure a path on the synchronous network.

3. A collection/distribution device interposed directly between an asynchronous network and a synchronous network comprising:

a first demapping unit which demaps first synchronous network frames comprising first asynchronous network frames flowing from the asynchronous network to the synchronous network on a plurality of links, into said first asynchronous network frames;

a collector which collects said first asynchronous network frames on the plurality of links onto a single link;

a first mapping unit which maps said first asynchronous network frames on said single link into a third synchronous network frame flowing to the synchronous network;

a second demapping unit which demaps a fourth synchronous network frame, comprising second asynchronous network frames mapped therein and flowing from the synchronous network to the asynchronous network, into said second asynchronous network frames mapped therein;

a distributor which distributes said second asynchronous network frames among a plurality of virtual ports; and a second mapping unit which maps each of said second asynchronous network frames distributed among the plurality of virtual ports into a respective one of said second synchronous network frames.

4. A collection/distribution device as claimed in claim 3, further comprising a switch unit which is provided between a plurality of other mapping/demapping units, which are connected with the asynchronous network over the plurality of links, and the collection/distribution device to redundantly configure a path on the synchronous network.

* * * * *